July 22, 1952 — E. KOLLER — 2,604,317

SPRING SUSPENSION

Filed March 25, 1947

Inventor
Ernst Koller
By
Young, Emery & Thompson
Attys.

Patented July 22, 1952

2,604,317

UNITED STATES PATENT OFFICE 2,604,317

SPRING SUSPENSION

Ernst Koller, Basel, Switzerland

Application March 25, 1947, Serial No. 737,009
In Switzerland April 10, 1946

4 Claims. (Cl. 267—21)

This invention relates to a spring suspension of the axle bearings for road vehicles, more particularly for trailers having the wheel axle rockably connected to the frame by a link member, the arrangement being characterised by the feature, that the supporting spring system disposed between the wheel axle and the frame consists of two springs stressed in tension, the directions, in which the forces of these springs act, forming an angle with one another and of which springs at least one is constructed as a rubber spring. Through such a supporting spring system an effective damping of the vibrations, when driving over inequalities of the ground, may be obtained, more particularly by so constructing and disposing the two springs that at least at the static normal load the ratio of the spring force component lying in the momentary direction of displacement of the point of attachment of the spring at the axle to the component lying at right angles thereto is in the case of one rubber spring, mainly acting as a supporting spring, greater than in the case of the other spring, mainly acting as a damping spring.

The invention is illustrated in the accompanying drawing by way of example.

Figure 1:
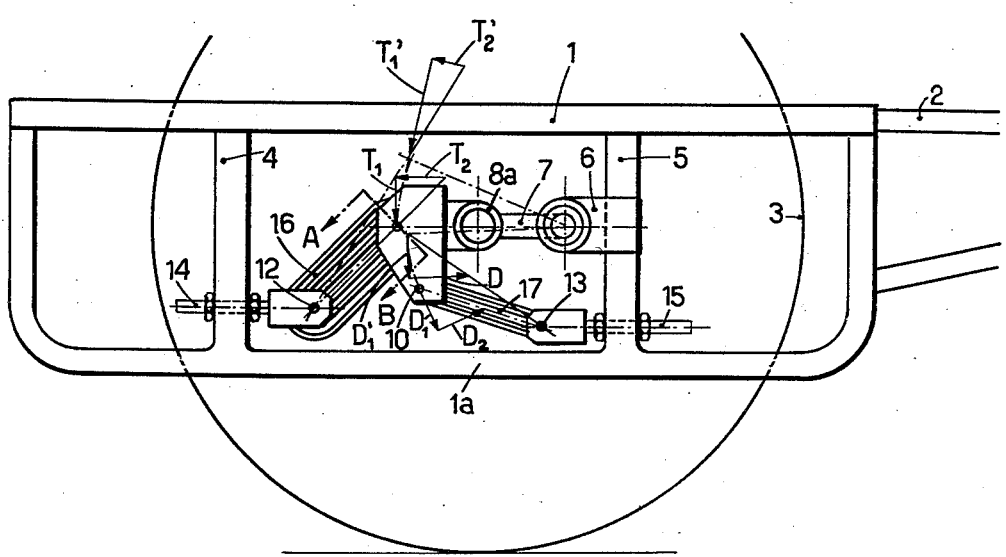
Figure 2:
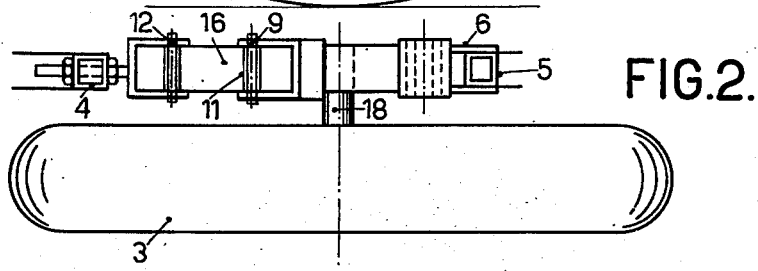

Fig. 1 shows a side elevation,

Fig. 2 a plan view and

Figure 3:
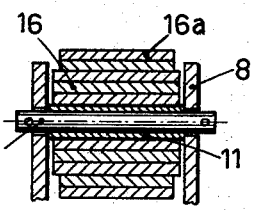

Fig. 3 a cross-section through one spring on the line A—B of Fig. 1.

According to Fig. 1 the upper frame member 1 is connected to the lower frame member 1a of the side of the frame, provided with the traction bars 2 and supporting the wheel 3 in a swingable manner, by the middle vertical struts 4 and 5. To the upper part of the strut 5 is fixed the bearing 6 for the axle arm member 7, on the unsupported end of which is mounted the axle holder 8a for the wheel axle 18. Fixed to the axle holder 8a is the yoke 8 which is provided in the upper part with the suspension pin 9 and in the lower part with the suspension pin 10. Over the pin 9 is slipped, as is to be seen more particularly in Fig. 3, the bearing bush 11 which is embraced by the rubber strap consisting of a plurality of superposed single straps. The rubber strap is composed of the inner three single straps 16 of equal width, and of the outer single straps 16a, also of equal width. On the pin 10 which may be provided with a bearing bush similar to the pin 9 is mounted the tension spring 17. This spring consists of two single straps. The two tension springs embrace at their lower end the suspension pins 12 and 13 respectively, which are fixed to the frame, so as to be adjustable with respect to it, by means of the tensioning devices consisting of screw bolts 14 and 15, the tensioning bolt 15 to a projection at the lower end of the strut 5 and the tensioning bolt 14 directly in the lower part of the strut 4.

As will be seen from Fig. 1, the supporting spring system disposed between the wheel axle 18 and the frame consists of two tension springs, the directions, in which the forces of these springs act, forming an angle with one another. It is not essential, however, that both tension springs shall consist of rubber springs, only one, preferably that attached to the strut 4, being constructed as a rubber spring. It will also be seen, that the two springs are so constructed and disposed that at least at the static normal load, corresponding to the position of the axle in Fig. 1, the ratio of the spring force component lying in the momentary direction of displacement of the point of attachment of the spring at the axle, the component $T_1$, to the component $T_2$ lying at right angles thereto is in the case of the rubber spring 16, 16a, acting mainly as a supporting spring, greater than the ratio of the corresponding components $D_1$ and $D_2$ in the case of the other tension spring 17, acting mainly as a damping spring.

The spring arrangement is furthermore such that, at least at the greatest spring deflection, indicated in Fig. 1 by dot and dash lines, the spring force component $T_1'$ lying in the momentary direction of displacement of the point of attachment of the spring is in the case of the rubber spring 16, 16a acting mainly as the supporting spring greater than the spring force component $T_2'$ lying at right angles thereto, whilst the corresponding component $D_1'$ of the other spring 17 is smaller than the component $D_2'$ lying at right angles thereto.

By such an arrangement it is possible to obtain a soft and compensated, noiseless springing with good vibration damping. Instead of being connected to the yoke 8, the springs may be connected in a flexible manner directly to the axle bearing.

The building up of the rubber spring straps out of a greater or smaller number of single straps has the advantage, that, by increasing or reducing the number of single straps, the spring forces can readily be adapted to the given conditions. Preferably, the rubber spring 16, 16a acting mainly as the supporting spring will have a greater carrying power and will therefore consist of a greater number of single straps than the other spring.

I claim:

1. A spring suspension arrangement for the wheel axles and frames of road vehicles and particularly trailers, comprising an arm rockably connected to the frame at one end and the other end being formed as an axle holder, the wheel axle being mounted on said axle holder and two rubber tension springs connected to the axle holder and the frame, one of the springs being mounted at an angle relative to the horizontal at one side and the other spring mounted at a different oblique angle toward the other side, both springs being load bearing.

2. A spring suspension arrangement according to claim 1, in which at least at the static normal load the steeper spring has a greater ratio of their force component lying in the momentary direction of displacement of the point of attachment of the spring at the axle holder to the component lying at right angles thereto than the other spring.

3. A spring suspension arrangement according to claim 1, in which in the greatest spring deflection the spring force component lying in the momentary direction of displacement of the point of attachment of the springs is for the steeper spring greater than the spring force component lying at right angles thereto, whereas for the other spring the first said spring force is smaller than the component at right angles thereto.

4. A spring suspension arrangement according to claim 1, in which a pair of vertical spaced struts are provided in the frame and a bearing is provided for the arm fixed on one of the struts of the frame, the abutment for one of the said two springs being fixed on the first mentioned strut, the abutment of the second spring being fixed on said second strut.

ERNST KOLLER.

REFERENCES CITED

The following references are of record in the file of this patent:

UNITED STATES PATENTS

| Number | Name | Date |
|---|---|---|
| 1,904,220 | Gzupkaytie | Apr. 18, 1933 |

FOREIGN PATENTS

| Number | Country | Date |
|---|---|---|
| 416,121 | Germany | July 8, 1925 |
| 442,591 | Great Britain | Feb. 7, 1936 |
| 810,850 | France | Jan. 6, 1937 |
| 833,285 | France | July 18, 1938 |